United States Patent [19]

Yedid et al.

[11] Patent Number: 5,396,517
[45] Date of Patent: Mar. 7, 1995

[54] TRANSVERSAL FILTER USEABLE IN ECHO CANCELER, DECISION FEEDBACK EQUALIZER APPLICATIONS FOR MINIMIZING NON-LINEAR DISTORTION IN SIGNALS CONVEYED OVER FULL DUPLEX TWO-WIRE COMMUNICATION LINK

[75] Inventors: Harry Yedid, Huntsville; Richard A. Burch; Michael D. Turner, both of Madison; Kevin W. Schneider, Huntsville, all of Ala.

[73] Assignee: Adtran, Huntsville, Ala.

[21] Appl. No.: 26,491

[22] Filed: Mar. 4, 1993

[51] Int. Cl.⁶ .................................... H03H 7/30
[52] U.S. Cl. ............................. 375/233; 379/411; 370/32.1; 375/350
[58] Field of Search .............. 375/12, 11, 14, 8, 103; 333/18, 28 R; 379/406, 410, 411, 93; 370/32.1; 364/724.16, 724

[56] References Cited

U.S. PATENT DOCUMENTS

| | | | |
|---|---|---|---|
| 4,594,479 | 7/1986 | Farrow et al. | 379/3 |
| 4,805,215 | 2/1989 | Miller | 379/411 |
| 4,888,762 | 12/1989 | Arai | 370/32.1 |
| 4,972,406 | 11/1990 | Dedic | 370/32.1 |
| 4,995,030 | 2/1991 | Helf | 370/32.1 |
| 5,029,167 | 7/1991 | Arnon et al. | 375/14 |
| 5,119,401 | 6/1992 | Tsujimoto | 375/14 |
| 5,222,084 | 6/1993 | Takahashi | 379/410 |

*Primary Examiner*—Stephen Chin
*Assistant Examiner*—Tesfaldet Bocure
*Attorney, Agent, or Firm*—Charles Wands

[57] ABSTRACT

The need to employ costly precision components to reduce non-linearities in the signal processing path of noise reduction circuitry such as an echo canceler and decision feedback equalizer is successfully addressed by a transversal filter which is capable of effectively tracking for non-linearities in system components that manifest themselves as added noise introduced into the signal propagation path. This non-linear tracking capability is attained by employing cascaded sets of weighting coefficient and scaling factor multiplying stages. The first set of weighting coefficients effectively modifies the contents of each of the transmitted symbol samples in the transversal filter delay line to produce respective sets of 'partial sums' associated with the respective data symbols employed in the data modulation scheme. The second, cascaded set of 'scaling' coefficients or factors is employed to scale selected ones of the sets of the partial sums.

27 Claims, 11 Drawing Sheets

TRANSVERSAL FILTER USEABLE IN ECHO CANCELER, DECISION FEEDBACK EQUALIZER APPLICATIONS FOR MINIMIZING NON-LINEAR DISTORTION IN SIGNALS CONVEYED OVER FULL DUPLEX TWO-WIRE COMMUNICATION LINK

FIELD OF THE INVENTION

The present invention relates in general to full duplex digital communication systems which employ a hybrid (two wire-to-four wire converter) circuit to interface respective transmitter and receiver paths with a two-wire communication link, and is particularly directed to a transversal filter, such as that employed in adaptive echo cancelers and equalizers, for effectively canceling echo signals and intersymbol interference (ISI) introduced via a leakage path through the hybrid circuit into a receive signal path through which the communication signals originating at the far end of the two-wire communication link are derived.

BACKGROUND OF THE INVENTION

A problem frequently encountered in communication systems which employ a limited bandwidth channel is the presence of non-linear distortion introduced into a signal propagation path. For example, in the case of a full duplex communication system having a limited bandwidth two-wire communication link, which is interfaced to transmit/receive components by way of a hybrid circuit, echoes from the outgoing transmit path may leak into the receive path due to line mismatch.

FIG. 1 diagrammatically illustrates one end of such a two-wire full duplex system having an outgoing or transmit path 11 coupled by way of a digital-to-analog (D-A) converter having a precision resistor network 13, and a (low pass) transmit signal path filter 15 to a first port 17 of a hybrid circuit 21. The precision resistor network within D-A converter 13 effectively performs a digital-to-analog conversion of outgoing digital signals into analog format for transmission to a remote station or site. Hybrid circuit 21 is operative to couple the transmit path 11 to a second port 22, to which a two-wire communication link 23 is terminated. Via a third port 25, hybrid circuit 21 couples the link 23 to a receiver or receive signal path 27. The receive signal path 27 includes a receiver path (low pass) filter 31 and an analog-to-digital converter 33 for converting the received signal into digital format.

Now, although the output of the analog-to-digital converter 33 contains a communication signal component that has been transmitted from the remote site via the two-wire communication link 23, due to line mismatch, it also contains a transmit signal component that has leaked from port 17 to receive signal path 27 as a data corrupting 'echo' signal. Customarily, elimination of this echo signal is accomplished by employing an echo canceler 35 which monitors the transmit signal on transmitter path 11 and the received signal in the receive path 27. Based upon observed characteristics of the two signals, an estimate of the echo is generated as an echo cancellation signal.

The echo cancellation signal may be generated by forming a summation of products of a plurality of adapted coefficients and individual samples of the symbols that make up the transmit signal. The derived echo 'replica' is then subtracted from the combined signal produced by analog-to-digital converter 33, as shown at 37, so as to excise the echo and thereby effectively prevent the echo from being propagated in the downstream receive path 27.

As diagrammatically illustrated in FIG. 2, an echo canceler is typically implemented as a transversal filter comprised of a multistage delay line 41, a set of coefficient multipliers 43 and a summation circuit 45. The coefficients of the transversal filter, when converged using the known transmit baud, form an estimated replica of the echo signal. Subtracting the estimated replica of the echo (output as a summation signal from summation circuit 45 to one input of a difference circuit 37) from the received signal yields a residual (error) signal, which is then combined with the transmitted signal samples in the multistage delay line 41 to recursively update the coefficients by means of the well known Least Mean Square (LMS) algorithm 47 for minimizing mean square error.

By their nature, echo cancelers are customarily linear devices, so that any non-linear distortion in the echo path to the echo canceler appears as noise mixed with the received signal and thereby degrades the performance of the overall receiver. For signals enjoying a high signal-to-noise ratio (SNR), this non-linear distortion causes minimal reduction in the quality of the received signal. However, for low SNR signals, the distortion significantly diminishes the performance of the receiver by completely obscuring the signal of interest, resulting in an unacceptable bit error rate.

To compensate for this deficiency and improve echo rejection, it is necessary to employ high precision components in the transmit path (for example necessitating the use of an extremely linear digital-to-analog converter), which drives up the cost of the communication network. This is particularly true where the resistor ladder network of the digital-to-analog converter contains very narrow tolerance (e.g. on the order of 0.001%) components.

In addition to their use in echo cancellation, transversal filters are also often employed in decision feedback equalizers. A decision feedback equalizer is diagrammatically illustrated in FIG. 3 as comprising a linear (transversal filter) section 51, to which the signal received from the far end or remote terminal is applied, and a decision feedback (transversal filter) section 52. Each of the transversal filter sections 51 and 52 has a filter configuration essentially corresponding to that shown in FIG. 2. Decision feedback section 52 generates a postcursor estimate output, which is differentially combined at 53 with the output of linear section 51 and the resulting signal is applied to a symbol decision algorithm 54. This signal is also subtracted, at 55, from the received symbol value estimates produced by the symbol decision algorithm 54 and a resulting residual error signal is employed by a tap update algorithm 56 to adjust the weighting coefficients of the linear and decision feedback sections. Again, component-sourced non-linearities, such as may be introduced by a non-precision resistor ladder network at the far end transmitter, cannot be effectively excised by a conventional transversal filter.

SUMMARY OF THE INVENTION

In accordance with the present invention, the above discussed problem of employing costly precision components to reduce non-linearities in the signal processing path of noise reduction circuitry is successfully addressed by a new and improved transversal filter configuration, which is capable of effectively tracking and thereby compensating for non-linearities in system components that manifest themselves as added noise introduced into the received signal propagation path. This non-linear tracking capability is attained by employing cascaded sets of weighting coefficient and scaling factor multiplying stages. The first set of weighting coefficients effectively modifies the contents of each of the transmitted symbol samples in the transversal filter delay line to produce respective sets of 'partial sums' associated with the respective data symbols employed in the data modulation scheme. The second, cascaded set of 'scaling' coefficients or factors is employed to scale selected ones of the sets of the partial sums.

More specifically, the transversal filter in accordance with a first embodiment of the present invention employs a first random access memory to implement the filter's multistage delay line (e.g. on the order of 128 symbols long). Successive address locations of the first memory store respectively successive and identical symbol values that propagate through the delay line (either outgoing symbols in the case of an echo canceler application, or received signals in the case of a decision feedback equalizer). Rather than employ a plurality of weighting coefficient multiplier stages, respective ones of which would be coupled with respective symbol taps of the delay line in a conventional coefficient multiply and sum scheme, a second random access memory is used to store the weighting coefficients $c_i$.

During a respective baud epoch, the addresses of each of the first and second memories are scanned or read-out in parallel, so as to access, for each 'tap' location of the delay line, an identical symbol value and its associated recursively adjustable weighting coefficient $c_i$. The symbol data value is employed to control the application of the accessed weighting coefficient to one of a set of weighting coefficient accumulators, respective ones of which are associated with the different symbols capable of being employed in the data modulation scheme. In the course of the parallel memory scan, each time a respective symbol value is accessed from the first memory, the weighting coefficient accumulator which is associated with that particular symbol value is scaled and incremented by the value of the weighting coefficient read out of the parallel-addressed location ('tap' location) of interest within the weighting coefficient memory. The effect of this successive scaling and incrementing of the contents of each symbol's associated weighting coefficient accumulator is to produce a set of running weighting coefficient totals or sums for each of the symbols employed in the data modulation scheme. At the end of the baud epoch, each weighting coefficient register will contain a respective weighting coefficient 'partial sum', effectively representative of the sum of the products of each of the accessed weighting coefficients scaled by the symbol value.

Since the magnitudes of respective ones of different symbol values employed in a particular modulation scheme can be expected to differ from unity it is necessary to adjust or modify those respective partial sums associated with symbol values whose magnitudes differ from unity. To multiply the weighting coefficient partial sum totals by actual symbol values employed in the data modulation scheme, the contents of the weighting coefficient 'partial sum' registers need only be shifted left or right (where data values differ in powers of two) or subjected to a shift and add (where data values differ from one another other than powers of two), thereby producing a set of partial sums: sum1, sum2, sum3 . . . sumN, where N is the number of symbols employed in the data modulation scheme.

As a non-limitative illustration, employing a split bi-phase scheme, having four symbol values, a data constellation may comprise the symbol magnitudes 1 and 3, each having positive and negative polarities to yield the four data symbol values: $(-3, -1, +1, +3)$. The use of a recursive accumulator scheme greatly reduces data processing complexity, especially for a delay line length of 128 or more symbols, as it obviates the need for individual multipliers for each of the delay line taps.

The inventive transversal filter further includes a plurality of scaling coefficient multiplier stages, which are respectively coupled to selected ones of the partial sums obtained by the set of accumulators of the weighting coefficient multiplier stage. Each scaling multiplier stage multiplies a respective partial sum (after adjustment for symbol value) by a respective recursively adjustable scaling coefficient or scaling factor. The number of second multiplier stages is less than the number of weighting coefficient accumulators, in order that the sum output of at least one of the adders is scaled by a fixed (e.g. unity) scaling factor. Keeping one of the scaling factors fixed at unity causes the coefficient updating algorithm to establish a unique, stable set of coefficients.

The scaled partial sums are supplied to a summation stage which produces the intended estimate, such as an echo estimate signal in the case of an echo cancellation application. The echo estimate signal is then differentially combined with a signal representative of a received echo signal on the receive signal path to produce a residual signal, which is coupled to the updating algorithm (coefficient generator) for adjusting the respective sets of weighting and scaling coefficients. In the case of a decision feedback equalizer, the estimate is subtracted from the linear transversal section to produce a (residual) signal for application to the decision algorithm and for updating the first coefficients of each filter section.

In accordance with a second embodiment of the transversal filter of the invention, a reduction in computational budget (elimination of one of the partial sum scaling factors) and cancellation of D.C. offset may be achieved by employing a D.C. reference value as a pseudo-symbol. This D.C. reference pseudo-symbol may have a value between zero and one, preferably as a negative power of two in order to facilitate multiplication with an associated weighting coefficient. The weighting coefficient itself, associated with the D.C. term, is stored in a dedicated address within the second (weighting coefficient storing) random access memory. After all of the weighting coefficients associated with the symbol values of the multiple stage delay line have been clocked out, then upon the next memory access clock, the weighting coefficient associated with the D.C. term is clocked out of memory and gated to the summation stage, to be summed together with the scaled partial sums. Multiplication of the D.C. term's weighting coefficient by the value of the D.C. term itself is expeditiously accomplished by simply shifting (in accordance with the chosen value—negative power of two—of the D.C. term) the contents of the D.C. term's weighting coefficient digital code during read out.

In each embodiment of the present invention, the weighting coefficient updating algorithm is operative, for each new baud epoch, to adjust or update the value of a respective weighting coefficient $c_i$, in accordance with the sum of the value of that weighting coefficient $c_i$ used in the immediately previous baud epoch with the residual (echo or decision) error and the delay associated with that particular stage of the multistage delay line with which that weighting coefficient is associated. The weighting coefficient generator is also operative to adjust a respective scaling coefficient $sc_i$, in accordance with the sum of the value of the second weighting coefficient $sc_i$ used in the immediately previous baud epoch with the product of a fixed scaling factor, the partial sum, and the residual (echo or decision) error.

DETAILED DESCRIPTION

Figure 1:
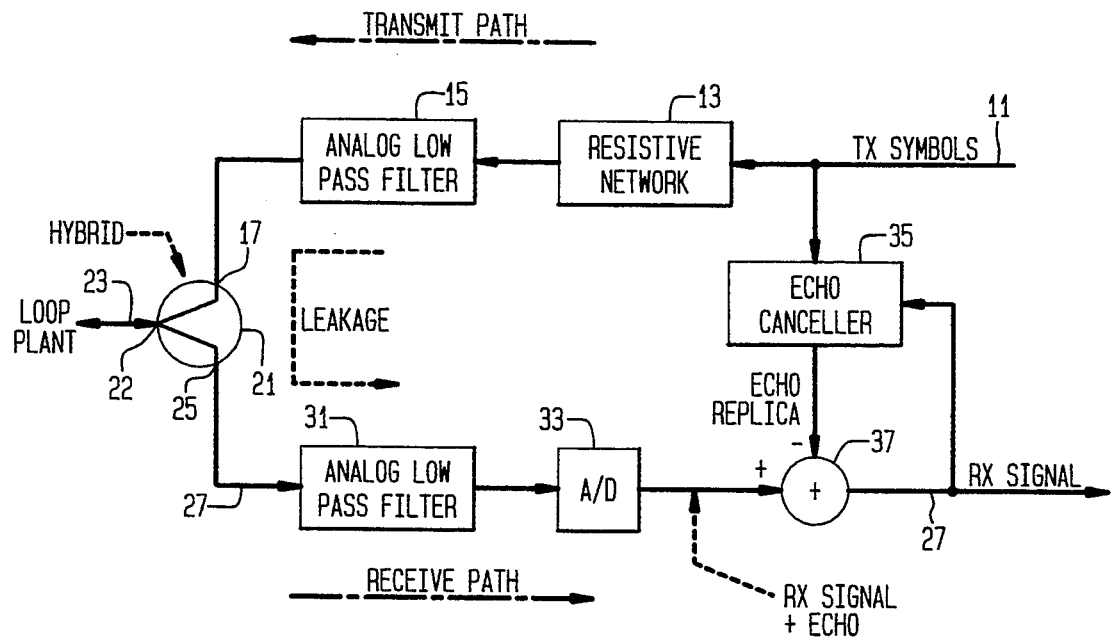
FIG. 1 diagrammatically illustrates one end of a full duplex two-wire system having a transmit path coupled by way of a digital-analog conversion resistor network and a low pass filter to a hybrid circuit.
Figure 2:
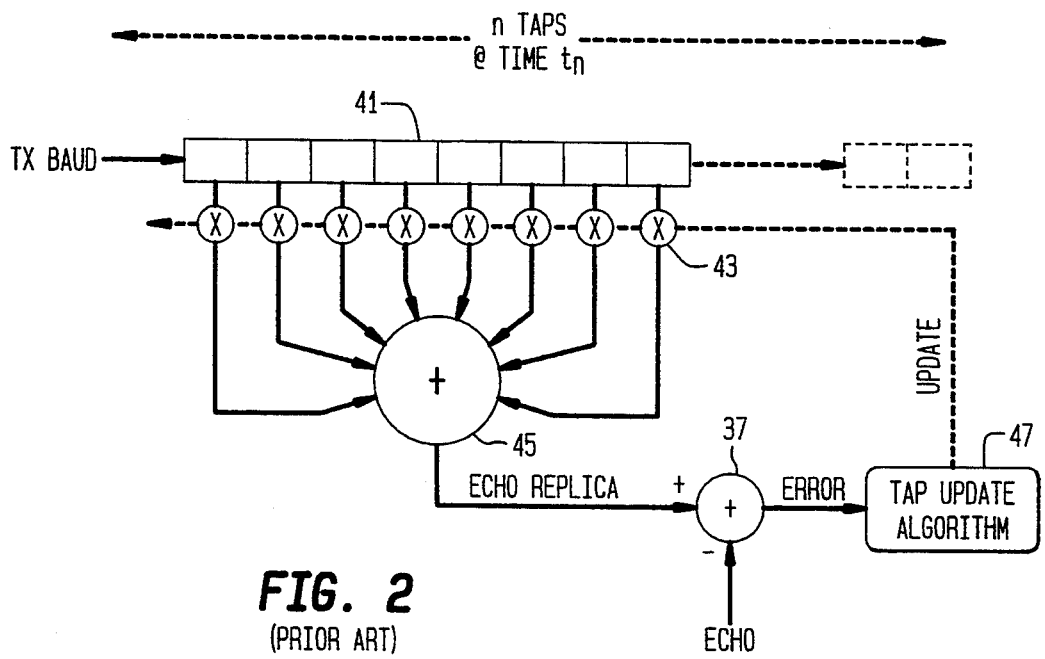
FIG. 2 diagrammatically illustrates a conventional transversal filter for an echo canceler comprised of a multistage delay line, a plurality of coefficient multipliers associated with each stage of the delay line and a summation circuit.

Before describing in detail the particular improved transversal filter in accordance with the present invention, it should be observed that the present invention resides primarily in a novel structural combination of conventional (digital) signal processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 4:
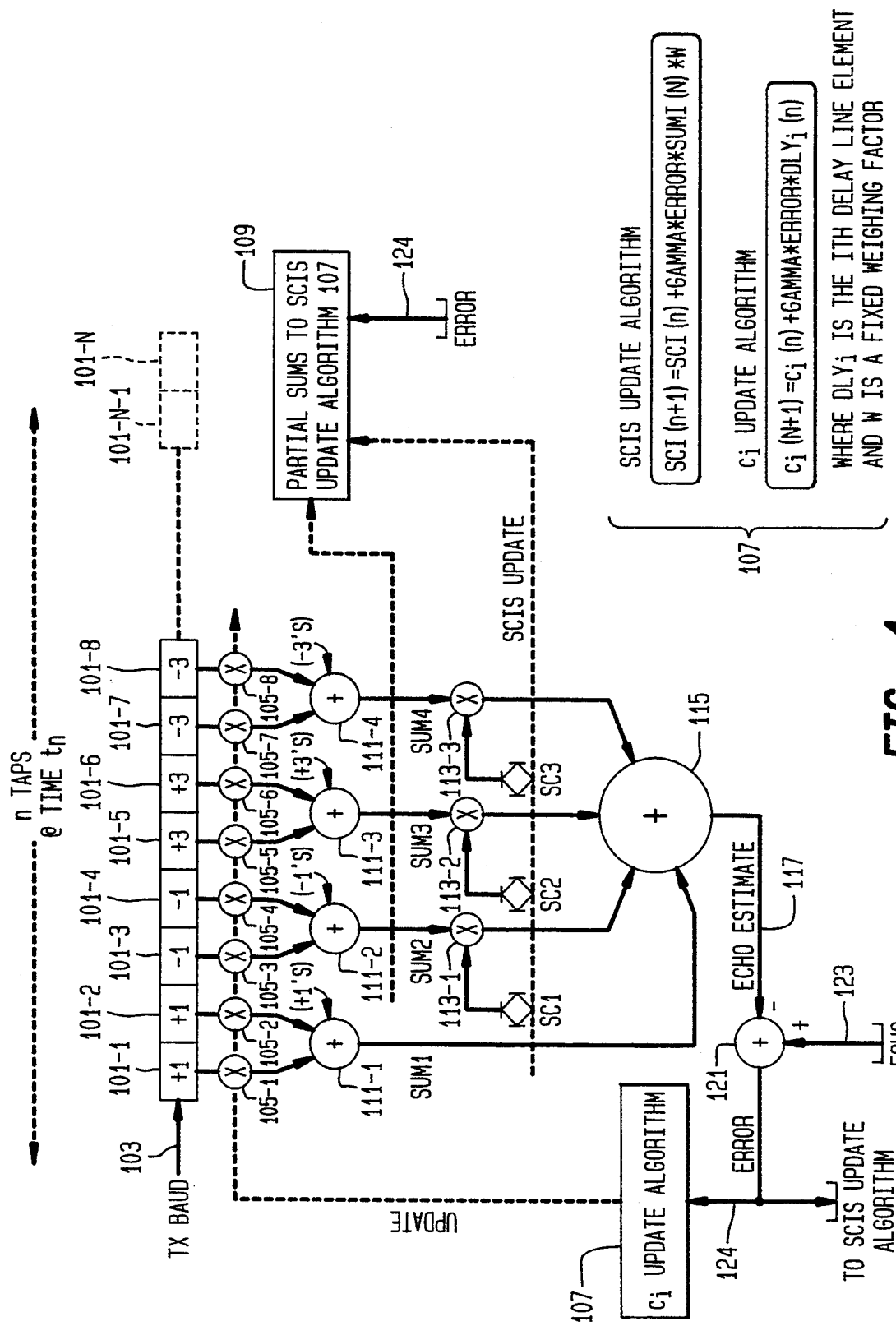
FIG. 4 is a functional block diagram of an echo canceler employing a transversal filter in accordance with a first embodiment of the present invention.

Referring now to FIG. 4, a functional block diagram of an echo canceler employing a transversal filter in accordance with a first embodiment of the present invention is illustrated as comprising a multistage delay line 101 having an input 103 coupled to receive some prescribed number N (e.g. 128) of successive transmitted symbols TX. For purposes of an illustrative example, the data modulation scheme has been chosen as having a split bi-phase constellation made up of symbol magnitudes 1 and 3, each having positive and negative polarities to yield a set of four data symbol values: ($-3$, $-1$, $+1$, $+3$).

In the example of FIG. 4, the first eight stages 101-1 . . . 101-8 of the N-stage delay line 101 are illustrated as respectively storing the symbols $+1$, $+1$, $-1$, $-1$, $+3$, $+3$, $-3$, $-3$, during a respective baud epoch. The remaining ninth through Nth stages of delay line 101 also contain respective ones of the four-value symbol set in accordance with the contents of the transmitted data stream, but are not shown in order to simplify the drawing. As symbol data values are clocked through the (128) stages 101-1 . . . 101-128 of the delay line 101 during successive baud epochs, the contents of each stage will vary in accordance with the variation in symbol content of the data stream, as a new symbol value is clocked into that stage of the delay line. Thus, the symbol values diagrammatically illustrated in FIG. 4 are associated with only an individual baud epoch.

In accordance with the functionality of the transversal filter, the respective identical value storing stages of the delay line 101 (i.e. all $+3$ value storing stages, all $+1$ value storing stages, etc.) are multiplied by respective ones of a plurality of (e.g. 128 for the case of a 128 stage delay line) weighting coefficients $c_i$. This intended functionality of the filter is represented in FIG. 4 by a plurality of weighting coefficient multipliers stages 105-1 . . . 105-N, where N, in the present example, equals 128. Namely, the functionality associated with each weighting coefficient multiplier stage 105-i is the multiplication of a respective symbol value stored in a respective stage 101-i of the delay line 101 by a respective first recursively adjustable or updated weighting coefficient $c_i$.

The weighting coefficients $c_i$ may be updated at successive baud epochs k by a coefficient generator or coefficient update algorithm 107 in accordance with the relationship:

$$c_i(k+1) = c_i(k) + gamma * error.dly_i(k), \qquad (1)$$

where $dly_i$ corresponds to delay line element 101-i, error is a differential input to the update algorithm, to be described below, and gamma is a gain factor dependent upon the power of the stored symbols $X_n$.

The product outputs of multipliers 105 are summed by means of a set of 'partial sum' accumulators 111-1, 111-2, . . . , 111-M, where M is the number of symbol values employed in the data modulation scheme. In the present example, since there are four different symbol values: (−3, −1, +1, +3), M is equal to 4, and four accumulators 111-1, . . . 111-4 are employed. During each baud epoch, each respective accumulator 111-i effectively sums the product of every occurrence of a particular symbol value stored in delay line 101 and the weighting coefficient associated with the delay line stage in which that particular symbol value is stored. In accordance with preferred digital hardware implementations of respective embodiments of the invention to be described below, the contents of each weighting coefficient accumulator is recursively combined with each newly input weighting coefficient value so as to facilitate the multiply function.

As noted above, as symbol data values are clocked through the (128) stages 101-1 . . . 101-128 of the delay line 101 during successive baud epochs, the contents of each stage 101-i will vary in accordance with the variation in symbol content of the data stream. Which stages of the delay line 101 will be coupled to which accumulators 111 is dynamic, varying from baud epoch to baud epoch, as the data stream is clocked through the filter. Thus, the coupling of the respective symbols values of the respective stages of delay line 101 to accumulators 111 diagrammatically illustrated in FIG. 4 is associated with only an individual baud epoch.

In the transmitted symbol sequence example of FIG. 4, the symbol −3 is shown as occupying the seventh and eighth stages 101-7, 101-8 of the delay line 101; the symbol −1 is shown as occupying the third and fourth stages 101-3, 101-4 of the delay line; the symbol +1 is shown as occupying the first and second stages 101-1, 101-2 of the delay line; and the symbol +3 is shown as occupying the fifth and sixth stages 101-5 and 101-6 of the delay line 101. Other instances of occurrence of each of the respective symbols within the remaining stages 101-9 . . . 101-128 of delay line 101 are not shown in FIG. 4, in order to simplify the drawing.

In the illustrated example, therefore, accumulator 111-1, which is associated with symbol value +1, will receive the products of weighting coefficient multipliers 105-1 and 105-2; accumulator 111-2, which is associated with symbol value −1, will receive the products of weighting coefficient multipliers 105-3, 105-4; accumulator 111-3, which is associated with symbol value +3, will receive the products of weighting coefficient multipliers 105-5, 105-6; and accumulator 111-4, which is associated with symbol value −3, will receive the products of weighting coefficient multipliers 105-7, 105-8.

Similarly, for the remaining occurrences of each of the respective symbols within stages 101-9 . . . 101-128 of delay line 101 not shown in FIG. 4, each of accumulators 111-1 . . . 111-4 will receive a respective (associated weighting coefficient x symbol) product. Namely, each of the four accumulators 111-1 . . . 111-4 will receive the product of every occurrence of a particular symbol value stored in delay line 101 and the weighting coefficient associated with the delay line stage in which that particular symbol value is stored, thereby producing four partial sums: sum1, sum2, sum3 and sum4.

Plural ones (less than M) of second multiplier stages, shown as second multiplier stages 113-1, 113-2, 113-3, . . . 113-(M-1), are respectively coupled to the partial sum outputs of a selected number (here M-1) of accumulators stages 111, for the purpose of scaling the partial sums. Each second multiplier stage 113-i multiplies a respective accumulator partial sum output sumi by a respective second recursively adjustable scaling factor $sc_i$, comprising scaling factors (sc1, sc2, sc3, . . . scM).

Although all of the partial sums (sum1-sumM) could be scaled by a set of scaling factors sc1-scMi, it has been observed that coefficients can grow out of bound, since they tend to compensate for large variations in the scaling factors. Keeping one of the scaling factors fixed (the output of accumulator 111-1 in the present example, which is effectively scaled or weighted by a fixed (e.g. unity) scaling factor) causes the coefficient updates to reach a unique, stable solution. In the example shown, the partial sums to be scaled are partial sums: sum2, sum 3 and sum4, produced by accumulators 111-2, 111-3 and 111-4, respectively.

The scaling factors $sc_i$ at successive baud intervals k are updated by a scaling coefficient generator 109 in accordance with the relationship:

$$sc_i(k+1) = sc_i(k) + gamma*error*sumi(k)*W, \qquad (2)$$

where W is a fixed weighting factor.

The resulting scaled partial sum outputs of multipliers 113 are supplied to a summation stage 115 which produces the intended echo estimate signal ECHO ESTIMATE at output 117. The echo estimate signal is then differentially combined in subtraction circuit 121 with a signal representative of a received echo signal ECHO on the receiver path 123, to produce a residual (error) signal 124, which is coupled to the updating algorithm (coefficient generator) 107 for adjusting the respective sets of first and second coefficients in accordance with the above updating algorithms (1) and (2).

Figure 5:
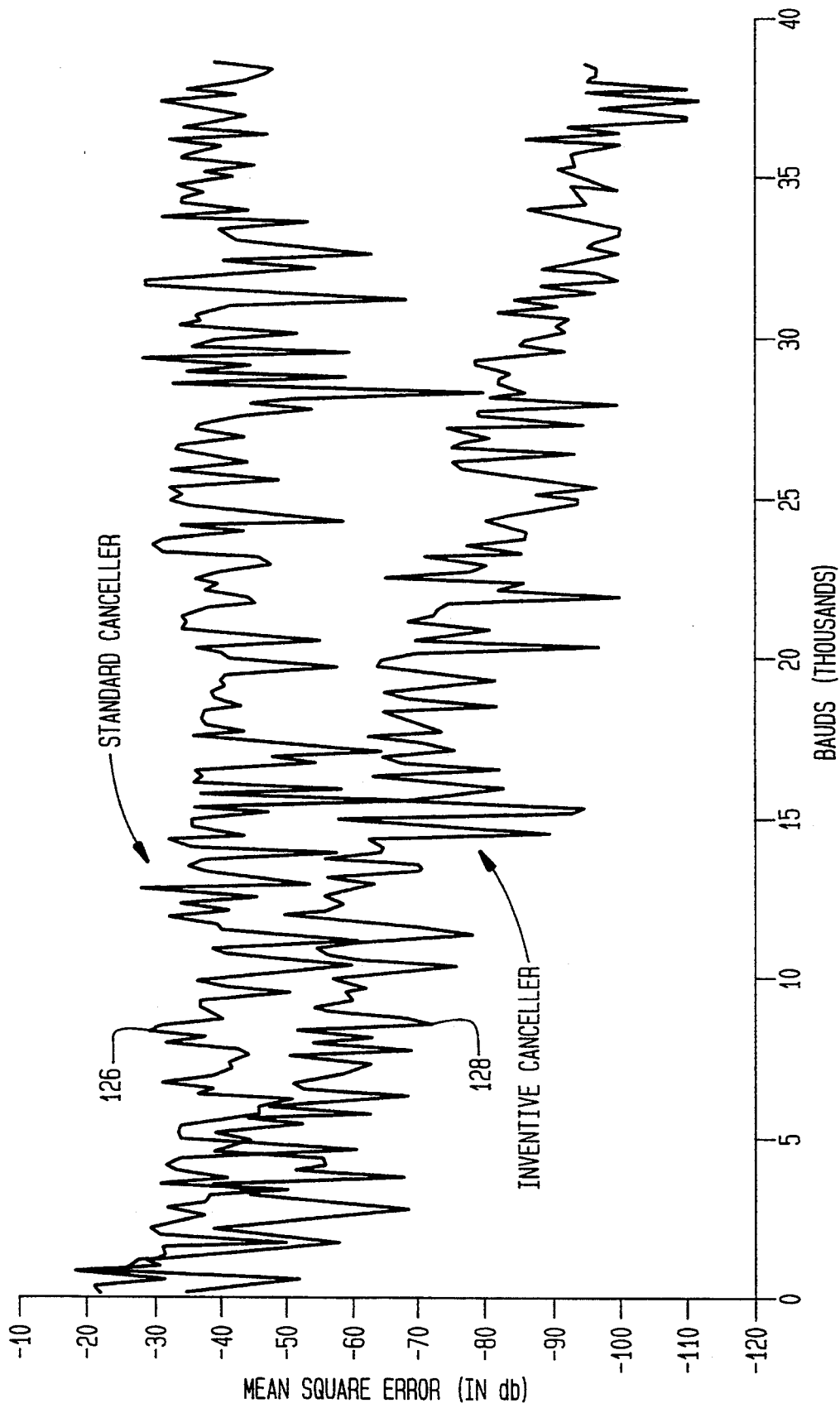
FIG. 5 shows mean square error vs. baud adaptation plots for a conventional echo canceler employing a transversal filter of the type shown in FIG. 1 and an echo canceler employing the improved transversal filter shown in FIG. 4.

FIG. 5 shows mean square error vs. baud adaptation plots 126 and 128, respectively, for a conventional echo canceler employing a transversal filter of the type shown in FIG. 1, and an echo canceler employing the improved transversal filter shown in FIG. 4, described above, for a set of symbol volts values −2.97, −0.99, +1.01, +2.97 respectively associated with the symbol set −3, −1, +1, +3 of the present example. This voltage sample set effectively represents voltages that would be produced by a resistor ladder made up of 1% tolerance components. It will be observed that the improved transversal filter of FIG. 4 enables the echo canceler to track non-linearities, as shown by a difference of greater than 60 dB in the mean square error term, so as to closely approximate the attenuation of near-end echo.

Figure 6:
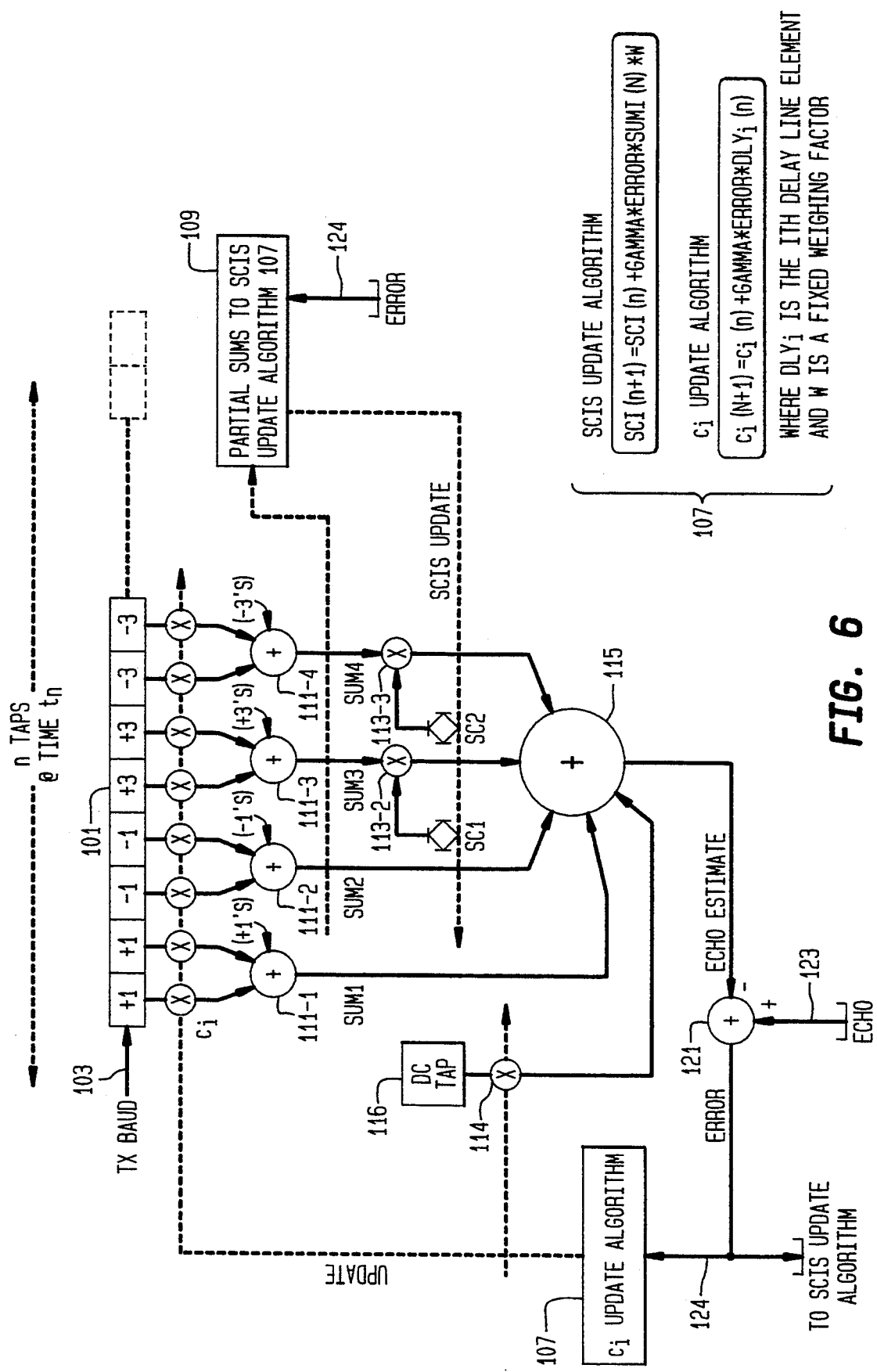
FIG. 6 diagrammatically illustrates an echo canceler employing a transversal filter in accordance with a second embodiment of the present invention for obtaining a reduction in computational budget and cancellation of D.C. offset.

FIG. 6 diagrammatically illustrates a second embodiment of the transversal filter of the present invention employed for near end echo cancellation applications, wherein a reduction in computational budget and cancellation of D.C. offset may be achieved by incorporating a D.C. reference input to which a fixed reference value is applied and coupling a further multiplier stage to the D.C. reference voltage input. More particularly, pursuant to this embodiment, a further multiplier stage 114 is operative to multiply a D.C. reference value 116 by an associated additional weighting coefficient $C_i$, applied to multiplier stage at 114, generated by weighting coefficient generator 107. The output of the further multiplier stage 114 is applied as a further input to summation stage 115. In addition, the scaling factor multiplier 113-1 is removed, so as to reduce computational intensity, with that the partial sum output sum2 being effectively scaled by unity, or applied directly as an input to summation circuit 115.

In each of the above described embodiments of the transversal filter of the present configuration, the filter's non-linear tracking capability is attained by employing cascaded sets of coefficient multiplying stages. In the first stage, a set of weighting coefficients $c_i$ effectively modifies the contents of each of the transmitted symbol samples in the transversal filter delay line to produce respective sets of "partial sums" (sum1 ... sumM) associated with the M respective data symbols employed in the data modulation scheme. The second, cascaded set of "scaling" coefficients are employed to scale selected ones of the sets of the partial sums.

Figure 7:
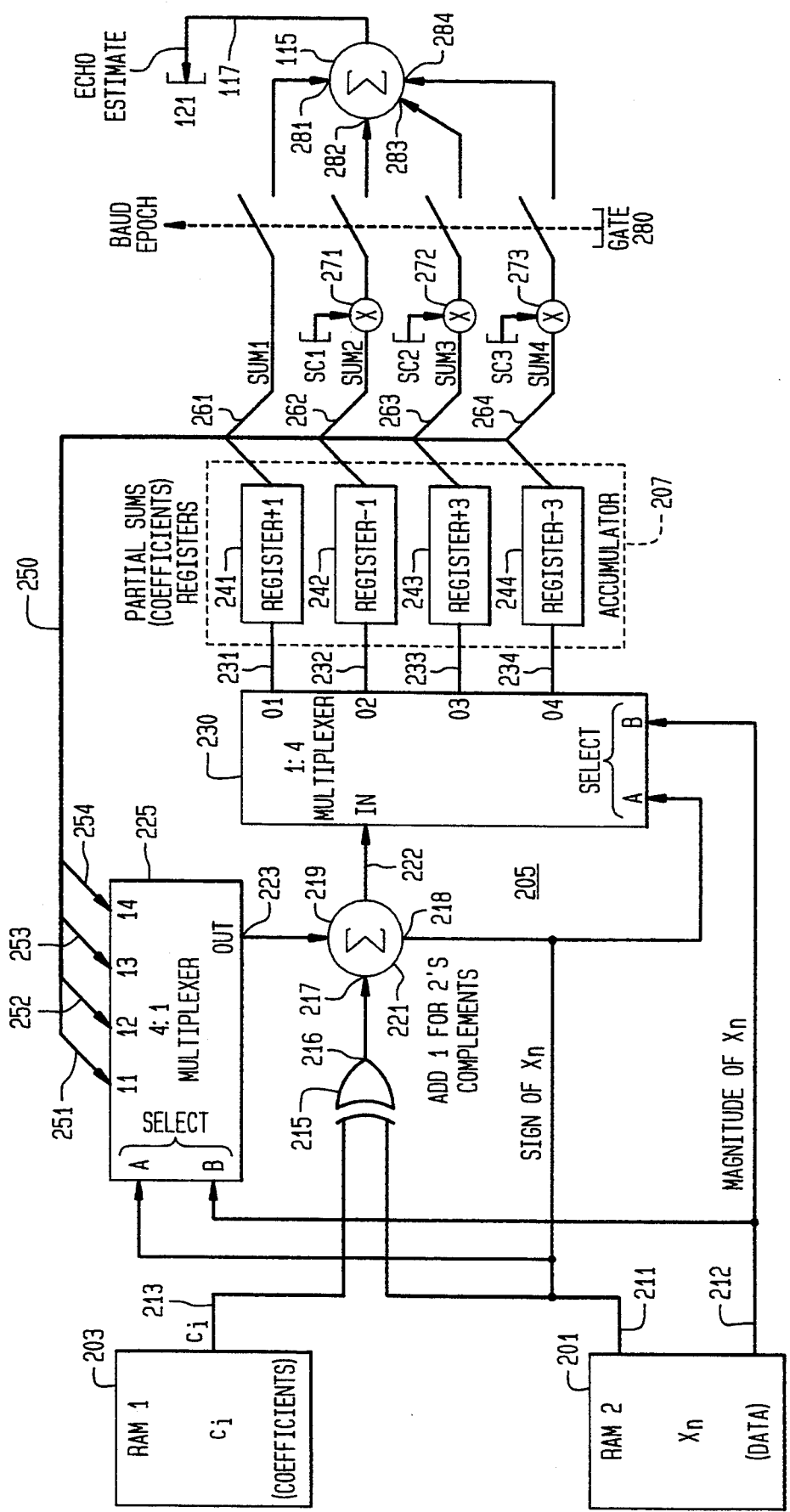
FIGS. 7 and 8 diagrammatically illustrate respective alternative digital signal processing circuitry implementations of the transversal filter of FIG. 4.
Figure 8:
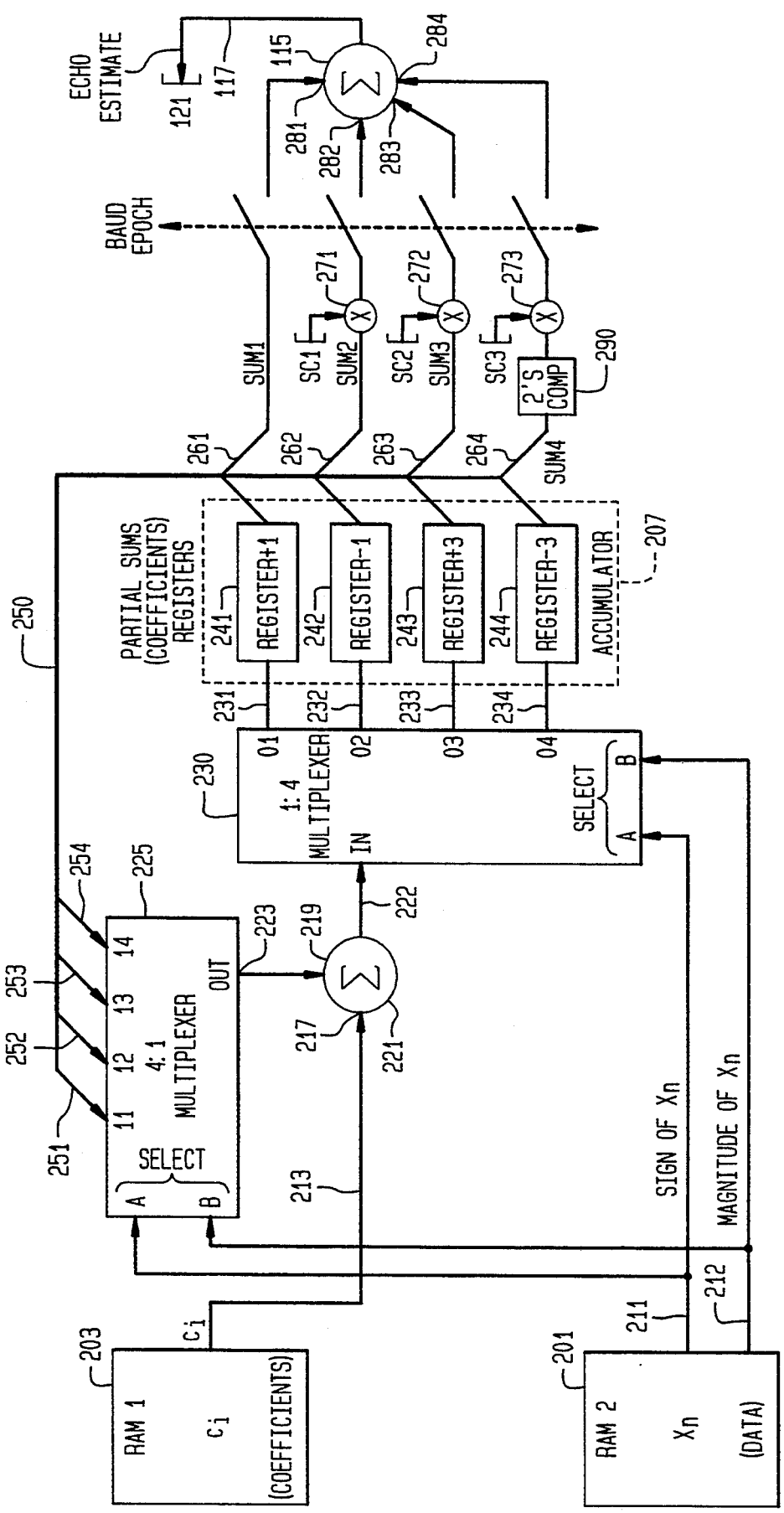
Figure 9:
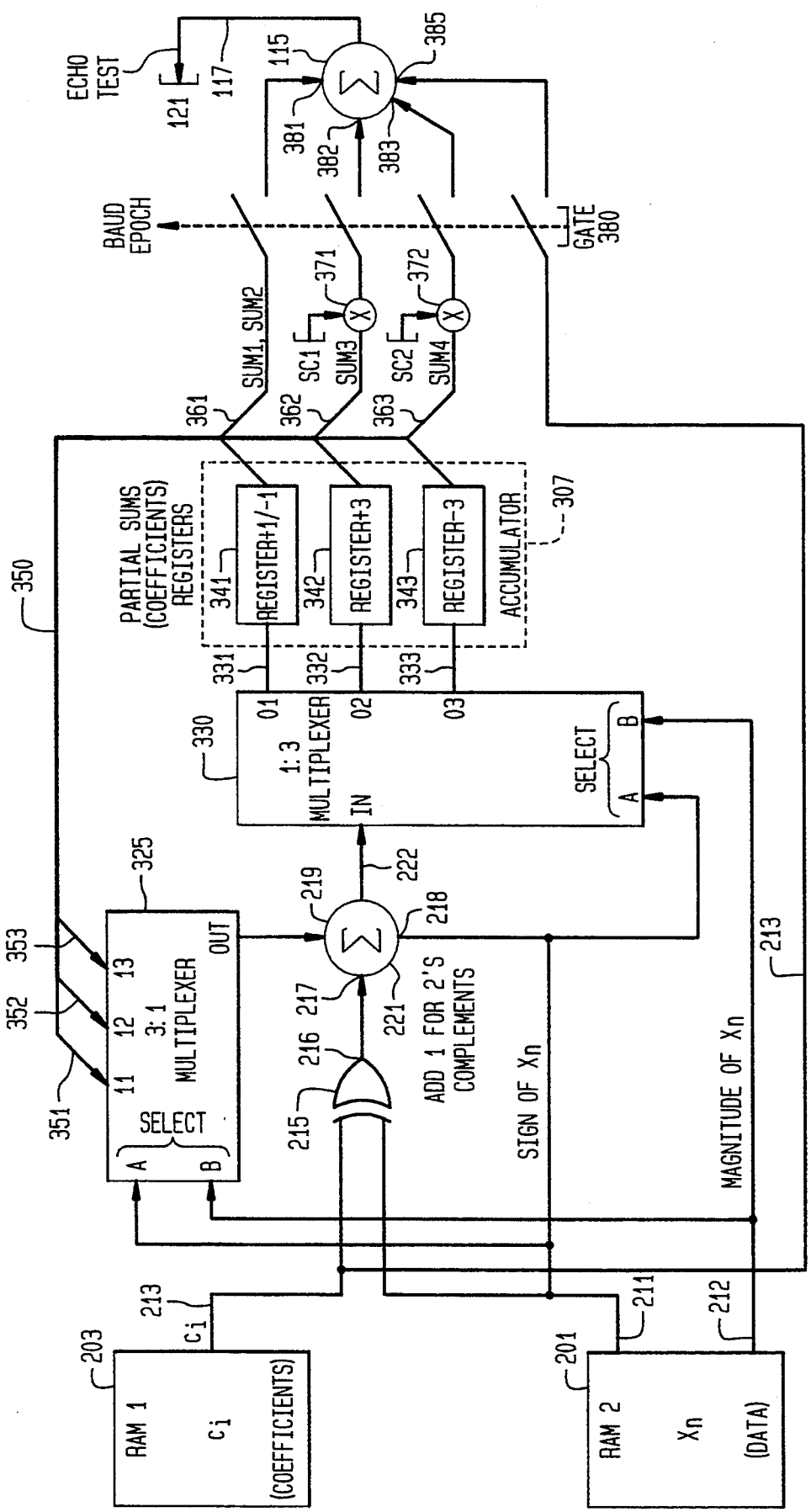
FIGS. 9 and 10 diagrammatically illustrate respective alternative digital signal processing circuitry implementations of the transversal filter of FIG. 6.
Figure 10:
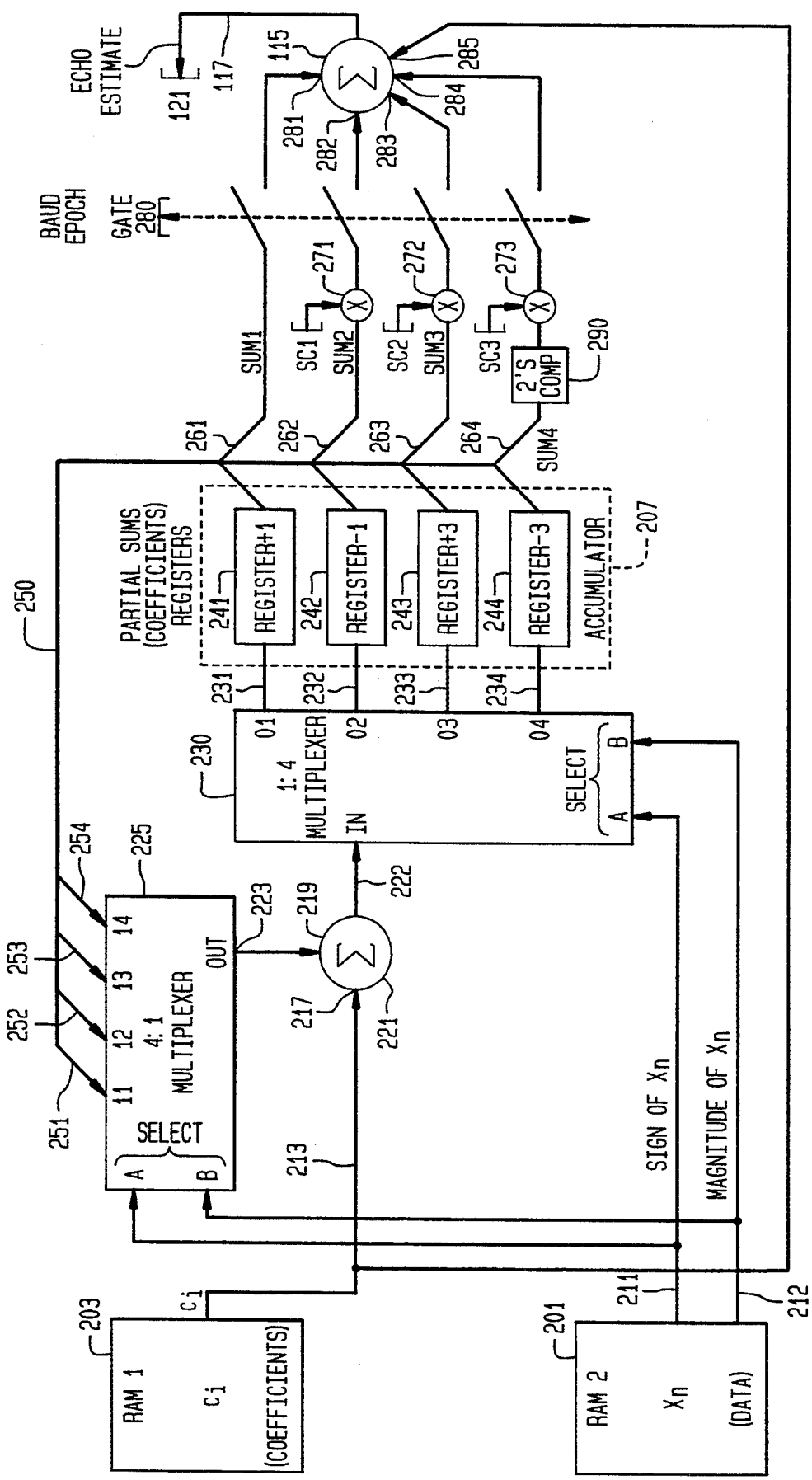

FIGS. 7 and 8 diagrammatically illustrate respective digital signal processing circuitry implementations of the transversal filter embodiment of FIG. 4, and FIGS. 9 and 10 diagrammatically illustrate respective digital signal processing circuitry implementations of the transversal filters of the transversal filter embodiment of FIG. 6. Advantageously, as will be described below, the digital implementations of FIGS. 7-10 employ a reduced computational complexity recursive accumulator mechanism to perform the respective multiplies for each of the weighting coefficients $c_i$.

More specifically, in accordance with the embodiment shown in FIG. 7, a first random access symbol data memory 201 is employed to implement the filter's multistage (e.g. 128 symbols long) delay line, corresponding to delay line 101, diagrammatically illustrated in FIG. 4, described supra. Successive address locations of symbol data memory 201 store respectively successive symbol values that propagate through the delay line (either outgoing symbols in the case of an echo canceler application, or received signals in the case of a decision feedback equalizer, to be described below).

In addition, rather than employ a plurality of weighting coefficient multiplier stages 105, respective ones of which would be coupled with respective symbol taps of a delay line in a conventional coefficient multiply and sum scheme, a second random access memory 203 is used to store the weighting coefficients $c_i$. During a respective baud epoch, the addresses of each of the first and second memories are scanned (read/clocked-out) in parallel, so as to access, for each 'tap' location of the delay line, a symbol value and an associated weighting coefficient $c_i$. These two values (symbol data and weighting coefficient) are applied, via a data-dependent interface 205 to a set of weighting coefficient accumulators 207, respective ones of which are associated with the different symbols capable of being employed in the data modulation scheme.

More specifically, the sign bit (MSB) of an accessed symbol data value $X_n$ and the accessed weighting coefficient $C_i$ are coupled over links 211 and 213 from memories 201 and 203, respectively, to an exclusive-OR gate 215, the output 216 of which is coupled to a first input 217 of an adder 221. The exclusive-OR operation performed by gate 215 will generate a '1's complement of the weighting coefficient $C_i$, if the corresponding symbol data bit location (i.e. the MSB of $X_n$) has a negative value (e.g. associated with symbols $-1$, $-3$ of the four symbol set of the of the present example). Concurrent with this exclusive-OR operation, if the sign bit of the symbol data value $X_n$ on link 211 is a '1', then a '1' is added, via input 218 of adder 221, to the contents of the accumulator supplied to input 219 of adder 221 from the output 223 of a 4:1 multiplexer 225. (Which of a set of registers within weighting coefficient accumulator 207, 4:1 multiplexer 225 couples to adder 221 is determined by the contents of the symbol data value applied to its A/B select inputs, as will be described below.) Adding a '1' to a respective accumulator serves to produce a two's complement of the coefficient $C_i$.

The output 222 of adder 221 is applied to the input of a 1:4 demultiplexer 230, respective outputs 231, 232, 233 and 234 of which are coupled to respective registers of accumulator 207. For the set of symbol values ($+3$, $-3$, $-1$, $+1$) of the present example, accumulator 207 contains four registers associated with adders 111-1 ... 111-4 of FIG. 4. Specifically, accumulator 207 is comprised of a first register 241 (corresponding to adder 111-1), which serves to accumulate weighting coefficient values associated with occurrences of the data symbol value $+1$. Register 241 is coupled to output 231 of 1:4 demultiplexer 230. (To which of registers 241–244 within accumulator 207, 1:4 demultiplexer 230 couples the output of adder 221 is, as in the case of 4:1 multiplexer 225, determined by the contents of the symbol data value applied to A/B select inputs, as will be described below.)

Accumulator 207 contains a second register 242 (corresponding to adder 111-2), which serves to accumulate weighting coefficient values associated with occurrences of the data symbol value $-1$. Register 242 is coupled to output 232 of 1:4 demultiplexer 230. Accumulator 207 contains a third register 243 (corresponding to adder 111-4), which serves to accumulate weighting coefficient values associated with occurrences of the data symbol values $+3$. Register 243 is coupled to output 233 of 1:4 demultiplexer 230. Accumulator 207 also contains a fourth register 244 (corresponding to adder 111-3), which serves to accumulate weighting coefficient values associated with occurrences of the data symbol values $-3$. Register 244 is coupled to output 234 of 1:4 demultiplexer 230. The contents of registers 241, 242, 243 and 244 are coupled via a bus 250 to respective inputs 251, 252, 253 and 254 of 4:1 multiplexer 225 and to respective partial sum links 261, 262, 263 and 264. Partial sum links 262, 263 and 264 are coupled to respective scaling factor multipliers 271, 272 and 273 (corresponding to respective multipliers 113-1, 113-2 and 113-3 in FIG. 4), outputs of which are gated (at 280) at the start of each baud epoch to respective inputs 281, 282 and 283 of adder 115, the output 117 of which provides the echo estimate, as described above with reference to FIG. 4. Link 261 from register 241 is gated (at 280) to input 281 of adder 115.

OPERATION

In the course of the parallel scan/read out of symbol data memory 201 and weighting coefficient memory 203, by a baud epoch read clock (not shown), each time a respective symbol value $X_n$ is clocked out of memory 201, that one of the registers 241–244 within weighting coefficient accumulator 207, which is associated with that particular symbol value, is incremented by the value of the weighting coefficient $C_i$ that is simultaneously read out of the parallel-addressed location ('tap' location) of interest within weighting coefficient memory 203.

For this purpose, the sign bit and magnitude segments of the symbol data word read out of memory 203 are employed as select inputs A/B for each of 4:1 multiplexer 225 and 1:4 demultiplexer 230, so that only one of registers 241-244 within accumulator 207, as determined by the contents of the symbol data word (i.e. one of $-3$, $-1$, $+1$, $+3$), will be coupled in a loopback path through adder 221. This loopback coupling of the current contents of the selected register with one of the inputs to adder 221 causes the contents of that particular register to be updated or incremented by the value of the weighting coefficient $C_i$ accessed from memory 203. This process is carried out for each of the (128) stages (memory addresses) of the delay line.

The effect of this successive incrementing of the contents of each symbol's associated weighting coefficient register within accumulator 207 is to produce a set of weighting coefficient totals or sums for each of the symbols (four in the present example) employed in the data modulation scheme. At the end of the baud epoch, each of weighting coefficient accumulation registers 241-244 will contain a respective weighting coefficient sum (based upon a symbol value of unity). Because the magnitudes of the symbols are not necessarily equal to unity (in the present example, two symbol values: $-3$ and $+3$), it is necessary to adjust the contents of the accumulator registers associated with those non-unity symbol values to obtain the required partial sum.

To multiply the weighting coefficient accumulator totals by the actual symbol values employed in the data modulation scheme, the contents of the weighting coefficient registers 241-244 need only be shifted up or down (where data values differ in powers of two) or subjected to a shift and add (where data values differ from one another other than powers of two), thereby producing a set of partial sums: sum1, sum2, sum3 . . . sumN, where N is the number of symbols employed in the data modulation scheme. For the present example, therefore, it is only necessary to perform a 'shift-left and add' upon the contents of registers 243 and 244, prior to reading out their contents for application to links 263, 264 for selective scaling and summation in adder 115.

As described above with reference to FIG. 4, a plurality of multiplier stages, shown in FIG. 7 as multiplier stages 271, 272 and 273 (corresponding to multiplier stages 113-1, 113-2, 113-3 of FIG. 4), are respectively coupled to the partial sum outputs of a selected number (here $M-1=3$) of the registers of accumulator 207, for the purpose of scaling the partial sums: sum1, sum2, sum3. Each multiplier stage 271, 272, 273 multiplies a respective accumulator partial output sumi by a respective recursively adjustable scaling factor $sc_i$, comprising scaling factors (sc1, sc2, . . . sc(M$-1=3$)).

As pointed out earlier, although all of the partial sums sum1-sumM could be scaled by a set of scaling factors sc1-scM, it has been observed that coefficients can grow out of bound, since they tend to compensate for large variations in the scaling factors. Keeping one of the scaling factors fixed (the output of ($+1$) partial sum1 accumulator register 241 in the present example, which is effectively scaled or weighted by a fixed (e.g. unity) scaling factor), causes the coefficient updates to reach a unique, stable solution. In the example shown in FIG. 7, the partial sums to be scaled by updated scaling factors $sc_i$ are partial sums: sum2, sum3 and sum4 produced by accumulator registers 242, 244, 243, respectively.

The scaling factors $sc_i$ at successive baud intervals k are updated in accordance with the equation (2) by scaling coefficient generator 109 (FIG. 4). The resulting scaled partial sum outputs of multipliers 271-273 and the unscaled partial sum on link 264 are gated to adder 115, which produces the intended echo estimate signal ECHO ESTIMATE on output link 117. As described previously, this echo estimate signal is then differentially combined in with a signal representative of a received echo signal ECHO on the receiver path, to produce a residual (error) signal, which is coupled to the weighting coefficient and scaling factor updating algorithms for adjusting the respective sets of weighting coefficients $C_i$ and scaling factors $sc_i$ in accordance with the above updating equations (1) and (2).

A second implementation of the embodiment of the transversal filter shown in FIG. 4 is diagrammatically illustrated in FIG. 8. In accordance with the FIG. 8 configuration, negative symbol values are handled by using a negative scaling factor for the $-1$ symbol value and a 2's complement operator coupled downstream of the accumulator register associated with the $-3$ symbol data value. This allows the exclusive-OR gate 215 to be removed from the input path the adder 221.

More particularly, the digital value of an accessed weighting coefficient $C_i$ stored in memory 203 is coupled over link 213 to a first input 217 of adder 221. The contents of a selected one of the set of four accumulator registers 241, 242, 243, 244 of accumulator 207 are supplied to input 219 of adder 221 from the output 223 of 4:1 multiplexer 225. Again, which of the set of accumulator registers within weighting coefficient accumulator 207, the contents of which are coupled over bus 250 to inputs 251, 252, 253 and 254 of multiplexer 225, are coupled to adder 221 is determined by the contents of the symbol data value applied to its A/B select inputs. The output 222 of adder 221 is applied to the input of 1:4 demultiplexer 230, respective outputs 231, 232, 233 and 234 of which are coupled to respective registers of accumulator 207. As in the embodiment of FIG. 7, for the set of symbol values ($+3$, $-3$, $-1$, $+1$) of the present example, accumulator 207 contains four registers associated with adders 111-1 . . . 111-4 of FIG. 4, as described previously.

Register 241 serves to accumulate weighting coefficient values associated with occurrences of the data symbol value $+1$; register 242 serves to accumulate weighting coefficient values associated with occurrences of the data symbol value $-1$; register 243 serves to accumulate weighting coefficient values associated with occurrences of the data symbol values $+3$; and register 244 serves to accumulate weighting coefficient values associated with occurrences of the data symbol values $-3$. In addition to being coupled to bus 250, the partial sums sum1, sum2, sum3 and sum4 respectively stored in accumulator registers 241, 242, 243 and 244 are coupled to respective links 261, 262, 263 and 264.

Link 261 is coupled to input 281 of adder 115. Links 262 and 263 are coupled to respective scaling factor multipliers 271 and 272 (corresponding to multipliers 113-1 and 113-3 in FIG. 4). Scaling multiplier 271 receives a negative value of sc1. Link 261 and the outputs of scaling factor multipliers 271 and 272 are gated (at 280) at the start of each baud epoch to respective inputs 281, 282 and 283 of adder 115, the output 117 of which provides the echo estimate, as described above. Link 264 from ($-3$) accumulator register 244 is coupled to a two's complement code converter 290, which effectively converts the contents of register 244 to a negative value. The output of two's complement code converter 290 is then applied to a scaling multiplier 273 to which scaling multiplier sc3 is applied. The output of scaling multiplier 273 is gated at 280 to input 284 of adder 115.

OPERATION

The operation of the implementation of FIG. 8 is essentially the same as that of FIG. 7, except that, with exclusive-OR gate 215 removed, the required negative sign for the (−1) symbol value is handled at the scaling factor input to scaling multiplier 271, and the required negative sign for the (−3) symbol value is handled by the two's complement converter 290 at the output of (−3) register 244.

In accordance with a second embodiment of the transversal filter of the invention, a functional block diagram of which is illustrated in FIG. 6, described above, a reduction in computational budget (elimination of one of the partial sum scaling factors) and cancellation of D.C. offset may be achieved by employing a fixed reference value as a pseudo-symbol. A first digital hardware implementation of this second embodiment is shown in FIG. 9.

In accordance with the FIG. 9 embodiment, a D.C. reference offset (typically having a value between zero and one, preferably as a negative power of two) is stored in a dedicated address within random access memory 203. For example, for a 128 stage delay line, the D.C. offset's weighting coefficient may be stored in a 129th address of weighting coefficient memory 203. Output link 213 is coupled via gate 280 to an input 385 of summation stage 115. As will be described below, after all of the weighting coefficients associated with the (128) symbol values of the multiple stage delay line have been clocked out of memory 203, then upon the next memory access clock, the weighting coefficient associated with the D.C. term is clocked out of memory 203 and gated via line 213 through gate 280 to summation stage 115, and thereby summed together with the scaled partial sums from accumulator 307. Multiplication of the D.C. term's weighting coefficient by the value of the D.C. term itself is accomplished by simply shifting (in accordance with the chosen value—negative power of two—of the D.C. term) the contents of the D.C. term's weighting coefficient digital code as is it read out of memory 203 and gated, at 380, from link 213 to summation stage 115.

As in the foregoing embodiments, the sign bit (MSB) of an accessed symbol data value $X_n$ on link 211 and the digital value of an accessed weighting coefficient $C_i$ on link 213 are respectively coupled to an exclusive-OR gate 215, the output 216 of which is coupled to a first input 217 of an adder 221. As in the embodiment of FIG. 7, exclusive-OR gate 215 generates a '1's complement of the weighting coefficient $C_i$, if the corresponding symbol data bit location (i.e. the MSB of $X_n$) has a negative value (e.g. associated with symbols −1, −3 of the four symbol set of the of the present example). Simultaneously, if the sign bit of the symbol data value $X_n$ on link 211 is a '1', then a '1' is added, via input 218 of adder 221, to the contents of the accumulator supplied to input 219 of adder 221 from the output 323 of a 3:1 multiplexer 325. Which of a set of registers within a weighting coefficient accumulator 307, 3:1 multiplexer 325 couples to adder 221 is determined by the contents of the symbol data value applied to its A/B select inputs. A/B select inputs of 3:1 multiplexer 325 are coupled to symbol value links 211/212. Adding a '1' to a respective accumulator serves to produce a two's complement of the coefficient $C_i$.

Because FIG. 6 employs one less scaling multiplier, so that both the (+1) and (−1) symbol values are not differentially scaled, a common accumulator register may be employed for both the (+1) and (−1) symbols. For this purpose, the output 222 of adder 221 is applied to the input of a 1:3 demultiplexer 330, respective outputs 331, 332, and 333 of which are coupled to respective accumulator registers of accumulator 307. With a reduction in the number of scaling factors employed, accumulator 307 contains only three accumulator registers. Specifically, accumulator 307 is comprised of a first register 341 (corresponding to adders 111-1 and 111-2 of FIG. 6), which serves to accumulate weighting coefficient values associated with occurrences of either of data symbol values +1 and −1. A single accumulator register is employed since, in the present example, neither of the partial sums associated with these two data symbol values is to be scaled by and $sc_i$ scaling factor, and each symbol has the same magnitude (1). As a consequence, the functionality of each of adders 111-1 and 111-2 can be combined into a single adder (accumulator register 341), the output of which represents the combination of partial sums (sum1 and sum2) which, in FIG. 6, are applied directly to adder 115 without scaling. In FIG. 9, this is shown by partial sums (sum1 and sum2) on link 361 gated to input 381 of adder 115. Accumulator register 341 is coupled to output 331 of 1:3 demultiplexer 330.

Accumulator 307 contains a second register 342 (corresponding to adder 111-3), which serves to accumulate weighting coefficient values associated with occurrences of the data symbol value +3. Register 342 is coupled to output 332 of 1:3 demultiplexer 330. Accumulator 307 further contains a third register 343 (corresponding to adder 111-4), which serves to accumulate weighting coefficient values associated with occurrences of the data symbol values −3. Register 343 is coupled to output 333 of 1:3 demultiplexer 330. The contents of registers 341, 342, and 343 are coupled via a bus 350 to respective inputs 351, 352, and 353 of 3:1 multiplexer 325 and to respective links 361, 362 and 363. Links 362 and 363 are coupled to respective scaling factor multipliers 371 and 372 (corresponding to multipliers 113-2 and 113-3 in FIG. 6), outputs of which are gated (at 380) at each baud epoch to respective inputs 382 and 383 of adder 115. Link 361 from +1/−1 register 341 is gated directly to input 381 of adder 115.

OPERATION

The operation of the implementation of FIG. 9 is similar to that of FIG. 7, except that, in the absence of scaling each of partial sums: (sum1 and sum2) associated with symbols of the same magnitude (+1 and −1), one less accumulator register is employed, and a fixed D.C. value is weighted and applied as a further input to adder 115. Specifically, during the parallel scan or read out of symbol data memory 201 and weighting coefficient memory 203, each time a respective symbol value $X_n$ is accessed from memory 201, that one of the accumulator registers 341–343 within weighting coefficient accumulator 307, which is associated with that particular symbol value, is incremented by the value of the weighting coefficient $C_i$ read out of the parallel-addressed location ('tap' location) of interest within weighting coefficient memory 203. As noted earlier, the sign bit and magnitude segments of the symbol data word read out of memory 203 are employed as select inputs A/B for each of 3:1 multiplexer 325 and 1:3 demultiplexer 330, so that only one of registers 341–343 within accumulator 307, as determined by the contents of the symbol data word (i.e. one of −3, −1, +1, +3), will be coupled in a loopback path through adder 221, so as to cause the contents of the selected register to be incremented by the value of the weighting coefficient $C_i$ accessed from memory 203. This process is carried out for each of the (128) stages (memory addresses) of the delay line.

After all of the weighting coefficients associated with the (128) symbol values of the multiple stage delay line have been clocked out of memory 203, then, upon the next memory access clock, the weighting coefficient associated with the D.C. term is clocked out of memory 203 and gated via line 213 through gate 380 to summation stage 115, and thereby summed together with the scaled partial sums from accumulator 307. Multiplication of the D.C. term's weighting coefficient by the value of the D.C. term itself is accomplished by shifting, based upon the selected negative power of two employed for the D.C. offset, the contents of the D.C. offset's weighting coefficient digital code as is it read out of memory 203 and gated from link 213 to summation stage 115.

This successive incrementing of the contents of each symbol's associated weighting coefficient register within accumulator 307 is to produce a set of weighting coefficient totals or sums for each of the symbols (four in the present example) employed in the data modulation scheme. At the end of the baud epoch, each of weighting coefficient accumulation registers 341–343 will contain a respective weighting coefficient sum (based upon a symbol value of unity).

Because the magnitudes of the symbols −3 and +3 are not equal to unity, it is necessary to adjust the contents of accumulator registers 342 and 343 to obtain the required partial sums. As described above, this adjustment may be readily accomplished performing a shift-left and add of the contents of accumulator registers 342,343, prior to gating the contents of these registers to inputs 382, 383 of adder 115.

Since the partial sums: (sum3 and sum4) respectively stored in accumulator registers 342 and 343 are to be scaled by scaling factors sc2 and sc3, associated multiplier stages, shown in FIG. 9 as multiplier stages 371 and 372 (corresponding to multiplier stages 113-2 and 113-3 of FIG. 6) are respectively coupled to the partial sum outputs sum3, sum4 of accumulator registers 342 and 343, for the purpose of scaling the partial sums (sum3 and sum4). The resulting scaled partial sums (sum3 and sum4) output from multipliers 372 and 373 are gated to inputs 382 and 383 of adder 115, together with the combined (+1/−1) partial sum output of accumulator register 341, which is gated to input 381 of adder 115, as described above. Adder 115 produces the intended echo estimate signal ECHO ESTIMATE on output link 117.

As explained previously, this echo estimate signal is then differentially combined in with a signal representative of a received echo signal ECHO on the receiver path, to produce a residual (error) signal, which is coupled to the weighting coefficient and scaling factor updating algorithms for adjusting the respective sets of weighting coefficients $C_i$ and scaling factors $sc_i$ in accordance with the above updating equations (1) and (2).

A second implementation of the embodiment of the transversal filter of FIG. 6 is diagrammatically illustrated in FIG. 10. In accordance with the FIG. 10 configuration, a 2's complement operator is coupled downstream of an accumulator register associated with the −3 symbol data value, as described above with reference to FIG. 8. This allows the exclusive-OR gate to be removed from the input path the adder 221.

Namely, the digital value of an accessed weighting coefficient $C_i$ stored in memory 203 is coupled over link 213 to a first input 217 of adder 221. The contents of a selected one of a set of four accumulator registers 241, 242, 243, 244 of accumulator 207 are supplied to input 219 of adder 221 from the output 223 of 4:1 multiplexer 225, the A/B select inputs of which are coupled to links 211, 212. The output 222 of adder 221 is applied to the input of 1:4 demultiplexer 230, respective outputs 231, 232, 233 and 234 of which are coupled to respective registers of accumulator 207. As in the embodiment of FIG. 8, for the set of symbol values +3, −3, −1, +1 of the present example, accumulator 207 contains four registers associated with adders 111-1 . . . 111-4 of FIG. 6.

Register 241 serves to accumulate weighting coefficient values associated with occurrences of the data symbol value +1; register 242 serves to accumulate weighting coefficient values associated with occurrences of the data symbol value −1; register 243 serves to accumulate weighting coefficient values associated with occurrences of the data symbol value +3; and register 244 serves to accumulate weighting coefficient values associated with occurrences of the data symbol value −3. In addition to being coupled to bus 250, the partial sums: (sum1, sum2, sum3, sum4) respectively stored in accumulator registers 241, 242, 243 and 244, are coupled to respective links 261, 262, 263 and 264.

Links 261 and 262 are gated, at 280, to respective inputs 281 and 282 of adder 115. Link 263 is coupled to scaling multiplier 271, to which scaling factor sc1 is also applied. The output of scaling factor multiplier 271 is are gated (at 280) to input 283 of adder 115. Link 264 from (−3) accumulator register 244 is coupled to a two's complement code converter 290, which effectively converts the contents of register 244 to a negative value. The output of two's complement code converter 290 is then scaled in scaling multiplier 272 by scaling factor sc2. The output of scaling multiplier 272 is gated, at 280, to input 284 of adder 115.

OPERATION

Other than accommodating for the D.C. offset voltage, the operation of the implementation of FIG. 10 is essentially the same as that of FIG. 8, except that, with exclusive-OR gate 215 removed, the required negative sign for the (−3) symbol value is handled by the two's complement converter 290 at the output of (−3) register 244. The DC offset voltage is handled in the same manner as in FIG. 9 in that, with all of the weighting coefficients associated with the (128) symbol values of the multiple stage delay line clocked out of memory 203, then upon the next memory access clock, the weighting coefficient associated with the D.C. term is clocked out of memory 203 and gated via line 213 through gate 280 to summation stage 115, and thereby summed together with the scaled partial sums from accumulator 207. Multiplication of the D.C. term's weighting coefficient by the value of the D.C. offset is preferably effected by shifting the contents of the D.C. offset's weighting coefficient digital code as is it read out of memory 203 and gated from link 213 to input 285 of summation stage 115.

Figure 3:
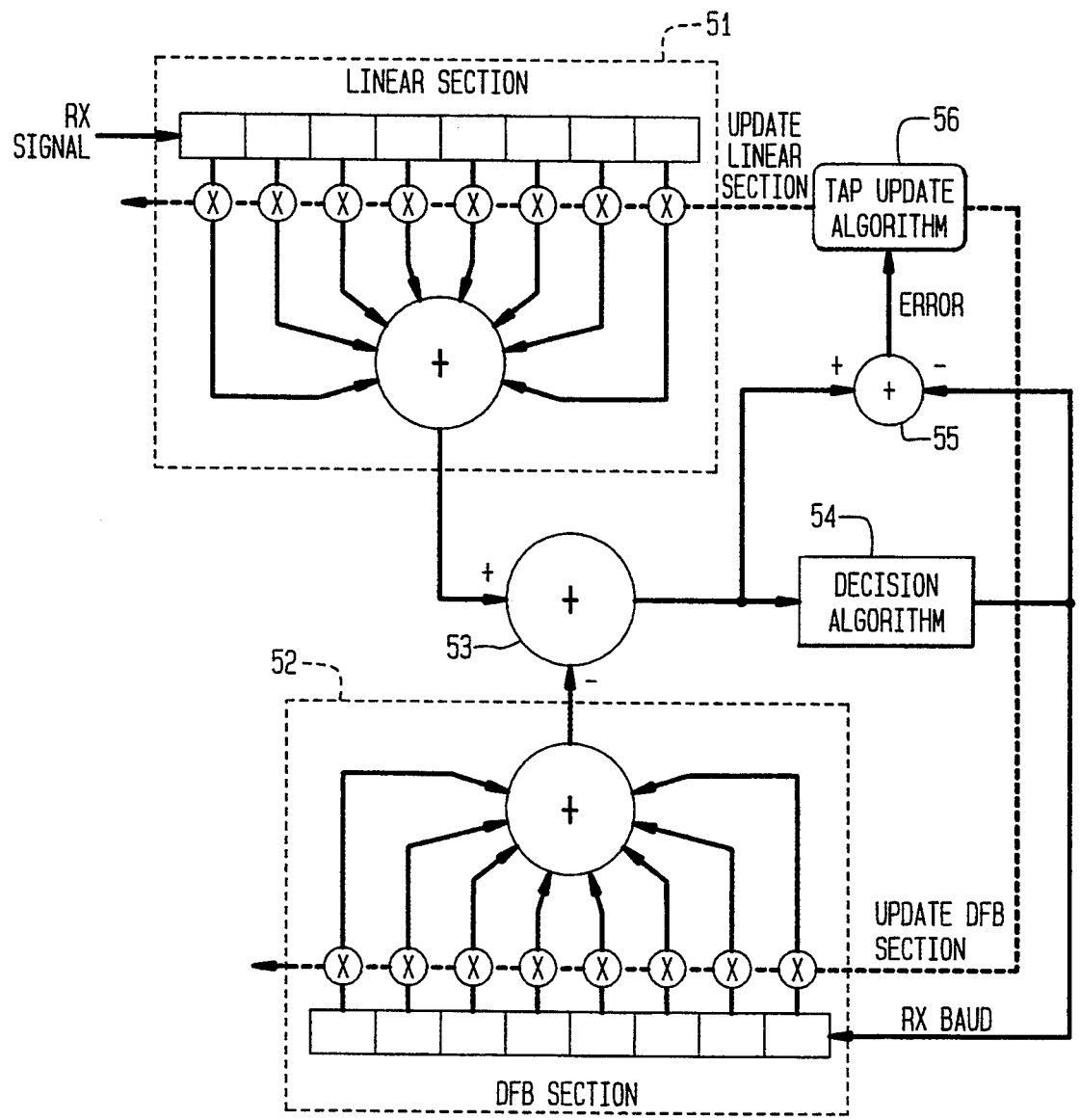
FIG. 3 diagrammatically illustrates the use of a conventional transversal filter in a decision feedback equalizer for compensating for intersymbol interference (ISI) introduced into the signal transmission path by the transmission medium (i.e. the loop plant)
Figure 11:
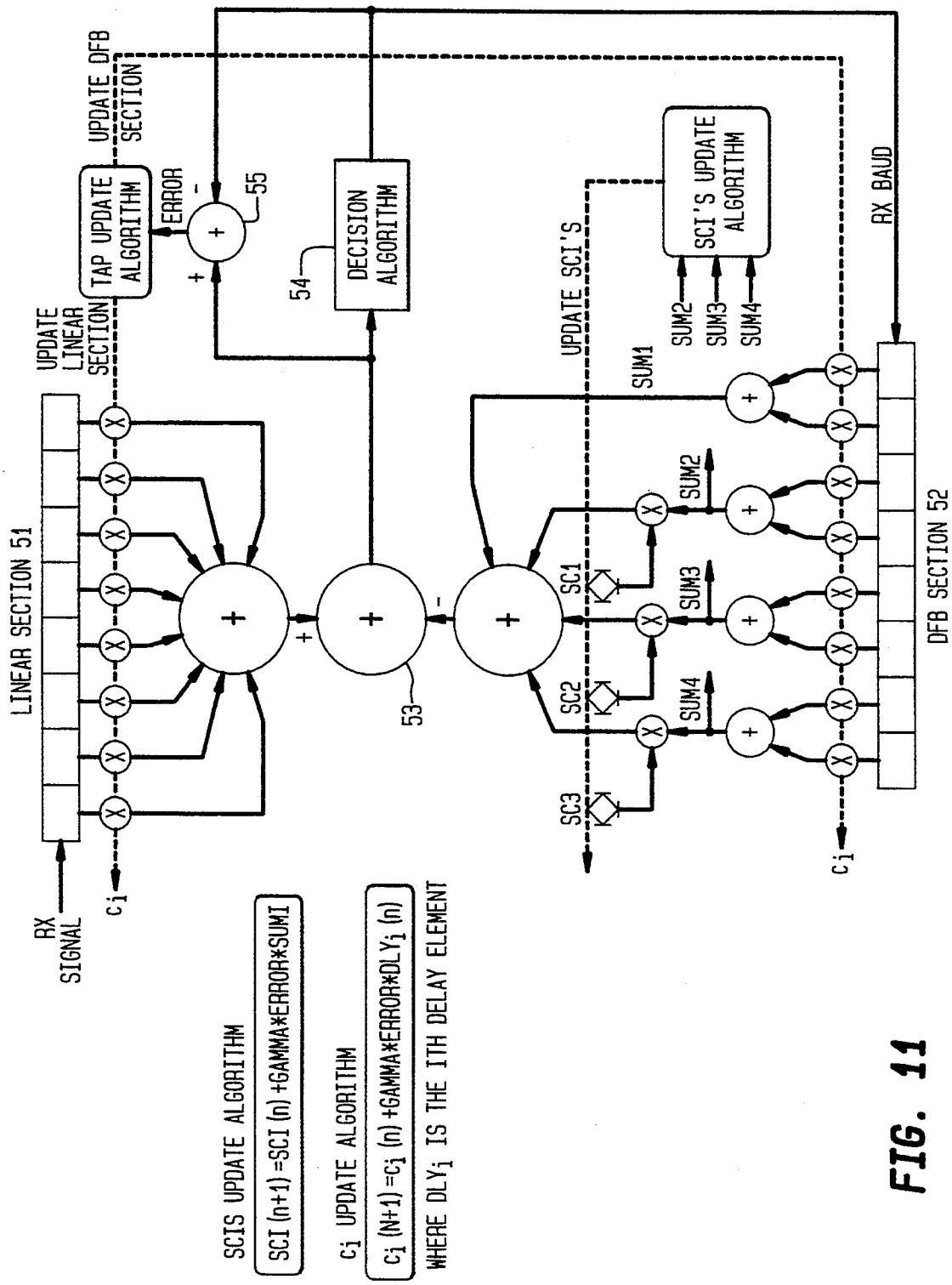
FIG. 11 shows a modification of a decision feedback equalizer of FIG. 3, wherein the improved transversal filter of FIGS. 4, 7 and 8 is substituted in place of the transversal filter employed in the decision feedback section.

As described above, in addition to their use in echo cancellation, transversal filters may also be employed in decision feedback equalizers for compensating for distortion introduced into the signal transmission path from the far end remote transmitter site. FIG. 11 shows a modification of the decision feedback equalizer configuration of FIG. 3, wherein the improved transversal filter of the present invention, described above in connection with the echo cancellation application of FIG. 4, is substituted in place of the transversal filter employed in the decision feedback section 52 of FIG. 3, described previously. Attention may be directed to the foregoing description of FIGS. 4, 7 and 8 for the details of the transversal filter, per se. As in the case of the improved echo cancellation application of FIG. 3, the modified decision feedback equalizer of FIG. 11, which incorporates the improved transversal filter of the present invention effectively compensates for component non-linearities, such as may be introduced by a non-precision resistor ladder network at the far end transmitter.

Figure 12:
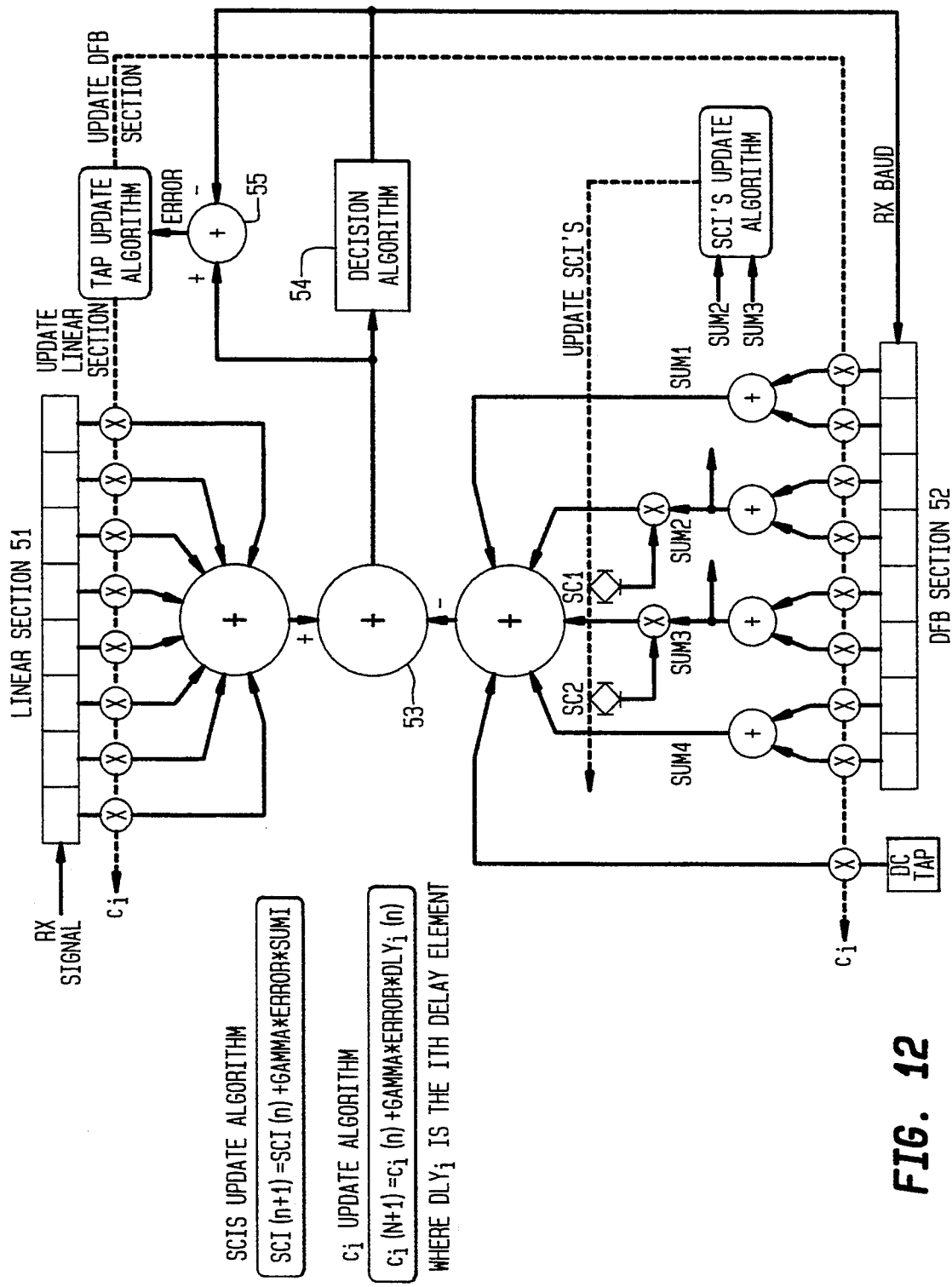
FIG. 12 diagrammatically illustrates a modification of the decision feedback equalizer of FIG. 10 to incorporate the second embodiment of the transversal filter of the present invention, shown in FIGS. 6, 9 and 10.

FIG. 12 diagrammatically illustrates a modification of the decision feedback equalizer of FIG. 11 to incorporate the second embodiment of the transversal filter of the present invention, described above with reference to FIGS. 6, 9 and 10, wherein a reduction in computation budget and cancellation of D.C. offset may be achieved by incorporating a D.C. reference input to which a D.C. reference is applied and coupling a further multiplier stage to the D.C. reference input. Attention may be directed to the foregoing description of FIGS. 6, 9 and 10 for the details of the reduced computational budget transversal filter, per se.

As will be appreciated from the foregoing description, the above discussed problem of employing costly precision components to reduce non-linearities in the signal processing path of noise reduction circuitry is successfully addressed in accordance with the present invention, by a new and improved transversal filter configuration which is capable of effectively tracking and thereby compensating for non-linearities in system components that manifest themselves as added noise introduced into the signal propagation path. This non-linear tracking capability is attained by employing cascaded sets of weighting coefficient and scaling factor multiplying stages. The first set of weighting coefficients effectively modifies the contents of each of the transmitted symbol samples in the transversal filter delay line to produce respective sets of 'partial sums' associated with the respective data symbols employed in the data modulation scheme. The second, cascaded set of 'scaling' coefficients or factors is employed to scale selected ones of the sets of the partial sums.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A transversal filter for a multi-symbol data modulation system comprising:
   a multistage delay line, through which successive symbols of said multi-symbol data modulation system, conveyed over a communication path in which said transversal filter is installable, are sequentially introduced;
   a plurality of partial sum generators, respective ones of which are associated with respective ones of symbols employed by said multi-symbol data modulation system, a respective one of said plurality of partial sum generators, which is associated with a respective one of said symbols, being coupled to receive first coefficients associated with each of the stages of said multistage delay line which store said respective one of said symbols, and producing a summation of the products of said first coefficients and said respective one of said symbols;
   a plurality of multiplier stages respectively coupled to a selected number of said partial sum generators, said selected number being less than said plurality of said partial sum generators, each multiplier stage being operative to multiply a respective partial sum by a respective second coefficient;
   a coefficient generator which is operative to generate said first and second coefficients; and
   a summation stage for summing together outputs of said plurality of multiplier stages and the output of at least one partial sum generator whose output is not coupled to a multiplier stage, so as to produce a summation signal, said summation signal being differentially combined with a signal representative of a noise containing signal carried by said communication path, to produce an output signal which is coupled to said coefficient generator for adjusting said first and second coefficients.

2. A transversal filter according to claim 1, further including a D.C. reference input to which a D.C. reference value is applied and a further multiplier stage coupled to said D.C. reference input and being operative to multiply said D.C. reference by a third coefficient generated by said coefficient generator, the output of said further multiplier stage being applied as a further input to said summation stage.

3. A transversal filter according to claim 1, wherein said coefficient generator is operative to store a third coefficient associated with a D.C. reference value, said third coefficient is controllably shifted in accordance with said D.C. reference and applied as a further input to said summation stage.

4. A transversal filter according to claim 1, wherein said coefficient generator is operative to adjust a respective first coefficient $c_i$, in accordance with the sum of a previous value of said first coefficient $c_i$ and the product of said output signal and the delay associated with that stage of said multistage delay line with which said respective first coefficient is associated.

5. A transversal filter according to claim 4, wherein said coefficient generator is operative to adjust a respective second coefficient $sc_i$, in accordance with the sum of a previous value of said second coefficient $sc_i$ and the product of said output signal and the output of a respective partial sum generator.

6. A transversal filter according to claim 1, wherein said coefficient generator is operative to adjust a respective second coefficient $sc_i$, in accordance with the sum of a previous value of said second coefficient $sc_i$ and the product of said output signal and the output of a respective partial sum generator.

7. A transversal filter according to claim 1, including a first memory, respective addressable locations of said first memory storing said successive symbols conveyed over said communication path, a second memory, respective addressable locations of said second memory storing respective ones of said first coefficients, and wherein said respective one of said plurality of partial sum generators comprises a partial sum accumulator which is operative to sum first coefficients read out of said second memory, which are associated with those stages of said multistage delay line which store a respective one of said symbols.

8. A transversal filter according to claim 7, wherein a respective one of said plurality of partial sum generators is operative to adjust the partial sum contents of its partial sum accumulator in accordance with its associated symbol value, thereby producing a summation of the products of first coefficients and said associated symbol value.

9. For use with a full duplex communication network having a transmitter path coupled by way of a digital-to-analog converter resistor network and a transmitter path filter network to a hybrid circuit which is operative to couple a two-wire communication link to said transmitter path and a receiver path, said receiver path including a receiver path filter network and an analog-to-digital converter, the output of said analog-to-digital converter containing a received signal from said two-wire communication link and a transmission signal leakage component from said hybrid circuit as an echo signal, an echo canceler for effectively canceling said echo signal from said receiver path comprising:

a multistage delay line, through which successive symbols of said multi-symbol data modulation system, conveyed over said transmitter path to said hybrid circuit for transmission by way of said two-wire communication link, are sequentially introduced;

a plurality of partial sum generators, respective ones of which are associated with respective ones of symbols employed by said multi-symbol data modulation system, a respective one of said plurality of partial sum generators, which is associated with a respective one of said symbols, being coupled to receive first coefficients associated with each of the stages of said multistage delay line which store said respective one of said symbols, and producing a summation of the products of said first coefficients and said respective one of said symbols;

a plurality of multiplier stages respectively coupled to a selected number of said partial sum generators, said selected number being less than said plurality of said partial sum generators, each multiplier stage being operative to multiply a respective partial sum by a respective second coefficient;

a coefficient generator operative to generate said first and second coefficients; and a summation stage for summing together outputs of said plurality of multiplier stages and the output of at least one partial sum generator whose output is not coupled to a multiplier stage, so as to produce a summation signal as an echo estimate signal, said echo estimate signal being differentially combined with the output of said analog-to-digital converter to produce an output signal which is coupled to said coefficient generator for adjusting said first and second coefficients.

10. An echo canceler according to claim 9, further including a D.C. reference input to which a D.C. reference is applied and a further multiplier stage coupled to said D.C. reference input and being operative to multiply said D.C. reference by a third coefficient generated by said coefficient generator, the output of said further multiplier stage being applied as a further input to said summation stage.

11. An echo canceler according to claim 9, wherein said coefficient generator is operative to store a third coefficient associated with a D.C. reference value, said third coefficient is controllably shifted in accordance with said D.C. reference and applied as a further input to said summation stage.

12. An echo canceler according to claim 9, wherein said coefficient generator is operative to adjust a respective first coefficient $c_i$, in accordance with the sum of a previous value of said first coefficient $c_j$ and the product of said output signal and the delay associated with the stage of said multistage delay line to which a respective first multiplier stage multiplying said respective first coefficient is coupled.

13. An echo canceler according to claim 12, wherein said coefficient generator is operative to adjust a respective second coefficient $sc_i$, in accordance with the sum of a previous value of said second coefficient $sc_j$ and the product of said output signal and the output of a respective partial sum generator.

14. An echo canceler according to claim 9, wherein said coefficient generator is operative to adjust a respective second coefficient $sc_i$, in accordance with the sum of a previous value of said second coefficient $sc_j$ and the product of said output signal and the output of a respective partial sum generator.

15. For use with a full duplex communication network having a communication link coupled to a far end transmitter site and a near end receive signal path, a decision feedback equalizer comprising:

a linear transversal filter section to which a signal received by way of said near end receive signal path from said communication link is applied; and a decision feedback transversal filter section which is operative to generate a postcursor output, said postcursor output being differentially combined with the output of said linear transversal filter section and the resulting differential signal is applied to a symbol decision operator, and wherein said differential signal is subtracted from received symbol value estimates derived by said symbol decision operator to produce a residual error signal for updating a first coefficient generator which supplies first coefficients of said linear transversal filter section, said decision feedback transversal filter section including a multistage delay line through which successive symbols from said symbol decision operator are sequentially introduced, a plurality of partial sum generators, respectively associated with respective ones of symbols from said symbol decision generator, a respective one of said plurality of partial sum generators, which is associated with a respective one of said symbols, being coupled to receive, from said first coefficient generator, first coefficients associated with each of the stages of said multistage delay line which store said respective one of said symbols, and producing a summation of the products of said first coefficients and the symbol values stored in the delay line stages with which said first coefficients are associated, a plurality of multiplier stages respectively coupled to a selected number of said partial sum generators, said selected number being less than said plurality of said partial sum generators, each multiplier stage being operative to multiply a respective partial sum by a respective second coefficient, a second coefficient generator operative to generate said second coefficients, and a summation stage for summing together outputs of said plurality of multiplier stages and the output of at least one partial sum generator whose output is not coupled to a multiplier stage, so as to produce a summation signal, said summation signal being differentially combined with a signal representative of a noise containing signal carried by said communication path, to produce said postcursor output signal.

16. A decision feedback equalizer according to claim 15, further including a D.C. reference input to which a D.C. reference is applied and a further multiplier stage coupled to said D.C. reference input and being operative to multiply said D.C. reference by a third coefficient generated by said first coefficient generator, the output of said further multiplier stage being applied as a further input to said summation stage.

17. A decision feedback equalizer according to claim 15, wherein said first coefficient generator is operative to store a third coefficient associated with a D.C. reference value, said third coefficient is controllably shifted in accordance with said D.C. reference and applied as a further input to said summation stage.

18. A decision feedback equalizer according to claim 17, wherein said first coefficient generator is operative to adjust a respective first coefficient $c_i$, in accordance with the sum of a previous value of said first coefficient $c_i$ and the product of said output signal and the delay associated with the stage of said multistage delay line to which a respective first multiplier stage multiplying said respective first coefficient is coupled.

19. A decision feedback equalizer according to claim 18, wherein said second coefficient generator is operative to adjust a respective second coefficient $sc_i$, in accordance with the sum of a previous value of said second coefficient $sc_i$ and the product of said output signal and the output of a respective partial sum generator.

20. A decision feedback equalizer according to claim 17, wherein said coefficient generator is operative to adjust a respective second coefficient $sc_i$, in accordance with the sum of a previous value of said second coefficient $sc_i$ and the product of said output signal and the output of a respective partial sum generator.

21. A method of filtering a multi-symbol data signal sequence transmitted over a communication path comprising the steps of:

(a) sequentially clocking said multi-symbol data signal sequence through a multistage delay line;

(b) for each of the respective symbols of said multi-symbol data signal sequence, summing first coefficients associated with each of the stages of said multistage delay line which store said each respective symbol and producing a partial sum of products of said first coefficients and said each respective symbol;

(c) for a selected number of partial products produced in step (b), multiplying a respective partial sum by a respective second coefficient to obtain a set of scaled partial products; and (d) summing together the scaled partial products obtained in step (c) and a partial sum or partial sums not scaled in step (c), so as to produce a summation signal, said summation signal being differentially combined with a signal representative of a noise containing signal carried by said communication path, to produce an output signal through which said first and second coefficients are adjusted.

22. A method according to claim 21, further including the step of (e) multiplying a D.C. reference by a third coefficient and summing in step (d) the resultant product.

23. A method according to claim 21, further including the step of (e) adjusting a respective first coefficient $c_i$, in accordance with the sum of a previous value of said first coefficient $c_i$ and the product of said output signal and the delay associated with that stage of said multistage delay line with which said respective first coefficient is associated.

24. A method according to claim 23, wherein step (e) comprises adjusting a respective second coefficient $sc_i$, in accordance with the sum of a previous value of said second coefficient $sc_i$ and the product of said output signal and a respective partial sum.

25. A method according to claim 21, further including the step (e) of adjusting a respective second coefficient $sc_i$, in accordance with the sum of a previous value of said second coefficient $sc_i$ and the product of said output signal and a respective partial sum.

26. A method according to claim 21, wherein step (a) comprises sequentially clocking said multi-symbol data signal sequence into a first memory, respective addressable locations of which store said successive symbols, and wherein step (b) comprises storing respective ones of said first coefficients in respective addressable locations of a second memory, and, for each of the respective symbols of said multi-symbol data signal sequence, summing in an accumulator first coefficients accessed from said second memory that are associated with respective memory locations of said first memory which store said each respective symbol, so that said accumulator produces a partial sum of the products of said first coefficients and said each respective symbol.

27. A method according to claim 26, wherein step (b) comprises adjusting the partial sum contents of a partial sum accumulator in accordance with its associated symbol value, thereby producing a summation of the products of first coefficients and said associated symbol value.

* * * * *